Patented Sept. 19, 1950

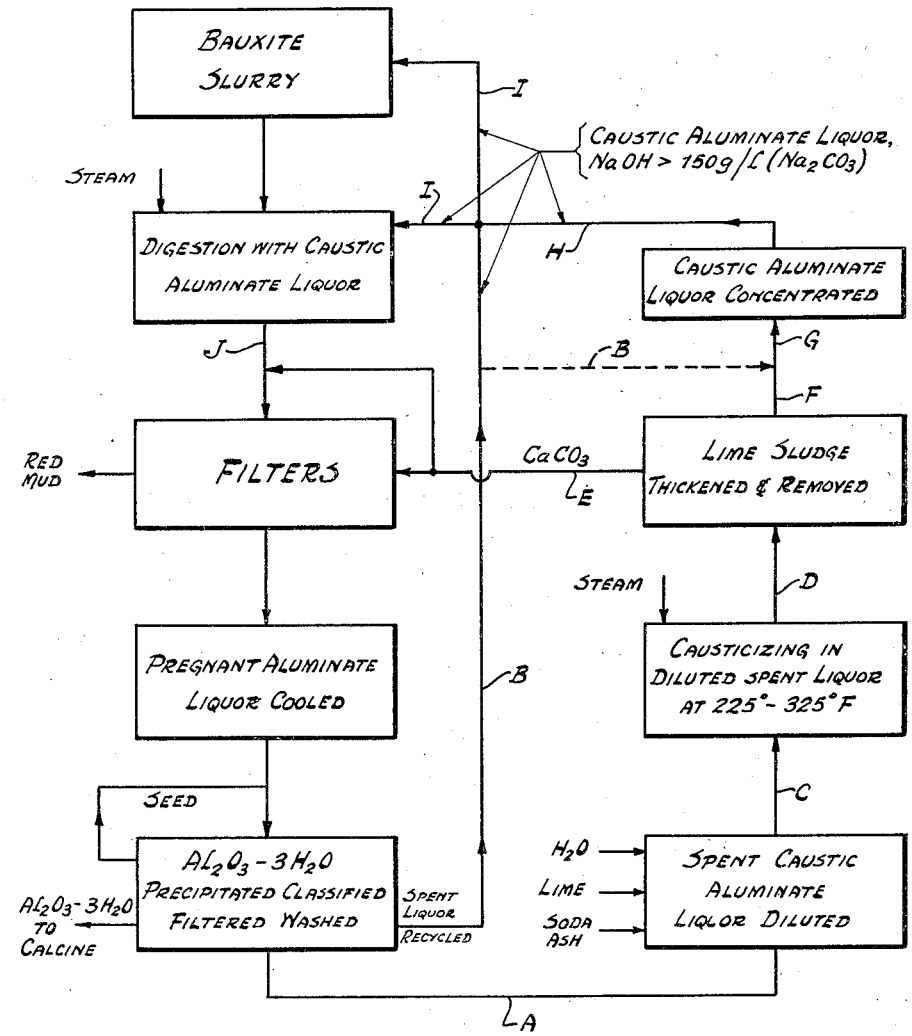

2,522,605

UNITED STATES PATENT OFFICE 2,522,605

PROCESS FOR EXTRACTION OF ALUMINA FROM ALUMINOUS ORES

Winston H. Cundiff, Baton Rouge, La., assignor to Kaiser Aluminum & Chemical Corporation, a corporation of Delaware Application May 13, 1949, Serial No. 93,067

11 Claims. (Cl. 23—143)

This invention relates to the production of alumina ores by the wet aluminate method. More particularly, the invention relates to an improved process of causticizing soda to produce the caustic soda utilized in conjunction with aluminate liquor as the digestion medium in the well-known Bayer process for production of alumina from aluminous ores.

The invention is particularly applicable in a process for the extraction of alumina from aluminous ores in which the ore is pressure digested in a caustic aluminate liquor to convert the alumina of the ore into alkali aluminate, the insolubles, such as red mud (iron oxides, silica, etc.) are removed from the aluminate liquor, alumina hydrate is recovered from the liquor by autoprecipitation upon cooling and seeding, and the spent caustic aluminate liquor is recycled to the digestion phase.

The causticizing according to the invention is performed outside of the primary alumina recovery system in a diluted portion of the spent caustic aluminate liquor remaining after precipitation and recovery of the alumina trihydrate.

Bayer Patent No. 515,895 is directed to the discovery that the spent liquor or aluminate lyes remaining after hydrate precipitation upon being properly concentrated would directly dissolve the alumina in bauxite provided a high temperature pressure digestion was employed. Thus, the necessity of performing the usual soda or aluminate lye and ore calcination and leaching was obviated. The patent, however, fails to mention any source for the essential initial and make-up supplies of caustic soda. Presumably, the caustic was either electrolytic NaOH, or that derived from a completely separate lime-soda ash causticization, as commonly practiced in Europe.

About 1900, Hall developed a process for producing the caustic soda in situ in the digesters of the primary system for alumina extraction from bauxite. This method, known as "inside causticizing," is practically universally used in the U. S. and simply consists in charging lime and soda ash to the digesters where causticization occurs in the presence of the bauxite and the recycled spent caustic aluminate liquor. Thus, formation of caustic and its utilization in dissolving the alumina of the bauxite take place together while the slurry is agitated and digested.

Although causticizing by this latter method is most expedient, it is definitely inefficient and consequently imposes serious handicaps in the production of alumina. The recycled spent liquor to which the lime and soda ash are charged contain caustic soda and alumina in amounts which prevent the economical causticization of the liquor to a value above about 70% causticization of the total soda, that is a caustic to total soda ratio of about .700. Consequently the maximum value of caustic concentration obtainable with normal digestion temperatures of about 300° F. and normal lime consumption, for example, 150 grams per liter, expressed as $Na_2CO_3$ causticized, is well below that which best functions as a solvent for the alumina in the bauxite. It has been demonstrated that in a Bayer process plant the alumina producing capacity per unit is roughly proportional to the caustic soda concentration in the digest liquor. Thus, the limitation on the caustic concentration imposed by inside causticizing reduces the production rate.

The causticizing reaction is a reversible one, and accordingly the presence of relatively high concentrations of reaction products in the spent liquor, that is, caustic soda, causes incomplete causticizing of the soda ash. Moreover, the equilibrium of the reaction is shifted by the presence of the sodium aluminate so as to further lower the proportion of soda ash causticized. To illustrate a normal plant procedure, spent liquor is fortified with soda ash until it contains approximately 217 grams equivalent $Na_2CO_3$ per liter. The fortified liquor is causticized in a slurry of bauxite by addition of lime and heating to 300° F. at the corresponding steam gauge pressure in a series of digesters. After digestion the concentration of caustic soda, including caustic combined in aluminate, is equivalent to only 150 grams of $Na_2CO_3$ per liter. Only 69% of the total soda is causticized. This caustic concentration cannot be economically increased by further addition of lime because the reaction under the particular conditions as to temperature, and reactant and product concentrations is very nearly in equilibrium as regards relative reaction rates of lime with carbonate and lime with aluminate to form calcium aluminate. Further lime addition would only slightly increase the causticization of soda but would greatly increase formation of undesirable calcium aluminate, which causes loss of alumina.

The incomplete causticization coupled with the unavoidable process carbonation of the caustic by the carbon-containing compounds in the aluminous ore and the absorption of $CO_2$ from the air, further gives rise to a serious disadvantage, namely the accumulation of a large inventory of sodium carbonate in the plant solutions until an excessively high equilibrium concentration is reached. The presence of such carbonate concentrations increases the money value of such liquors, which must be separated from the red mud and from hydrate, and serves no useful purpose in the process. In fact, in lowering the caustic to total soda ratio it impairs efficiency of alumina recovery. Various means, such as salting out in the evaporators or crystallizing in the coolers have been employed to reduce the carbonate concentration where monohydrate is being extracted, but are not feasible for trihydrate extraction. Where salting out of carbonate from trihydrate liquors is attempted serious difficulty is encountered in separating the slime covered crystals from the syrupy liquor.

In attacking the problem, it was known that optimum causticizing efficiency could be obtained by reaction of lime and soda ash in a fresh water medium, that is, in the absence of caustic and aluminate as reaction products, such as practiced in Europe. However, such a procedure, although producing a high caustic concentration for bauxite digestion and a higher caustic to total soda ratio, affords no satisfactory control of the carbonate in the plant liquor in recovery of trihydrate.

Accordingly, it is a primary object and purpose of the invention to provide an improved process of causticizing by which the carbonate concentration in the plant liquors may be substantially reduced and maintained within practical limits while at the same time an optimum caustic soda concentration for bauxite digestion is produced and maintained. A further object of the invention is to provide a process whereby the unit capacity in the production of alumina is substantially increased with an attendant decrease in cost. Still another object is to provide a process for effecting causticizing whereby the lime sludge (calcium carbonate) may be reburned to furnish lime for subsequent causticizing and/or may be sent to the primary system to aid in settling and filtering the red mud.

These and other objects and advantageous results are obtained directly or indirectly by increasing the ultimate percent causticization of the carbonate in the causticizing reaction to a value of about 90% or over, while simultaneously causticizing the carbonate present in the plant liquor due to process carbonation so that only about 20% of the total soda in the circulating plant liquor is carbonate.

The present invention essentially comprises reacting lime and soda ash in a diluted portion of the spent caustic aluminate liquor from the hydrate precipitation by a high temperature pressure digestion in the diluted liquor.

Initially, it was found necessary to operate at extremely high dilution, for example, only 50 grams per liter total soda, expressed as equivalent $Na_2CO_3$, when reacting lime and soda ash at temperatures of about 212° F. (atmospheric pressure) in order to obtain a satisfactorily high causticizing efficiency. At such dilution, however, the caustic soda solution formed would require excessive evaporation prior to charging to the ore digesters, in order to provide the desired optimum caustic soda concentration. This would largely tend to offset the advantages obtained by causticizing in a diluted portion of the spent liquor. Increase of the total soda concentration to desirable economical values of from about 100 to 175 grams per liter, that is, in a liquor much less dilute, resulted in caustic to total soda ratios scarcely better than obtained by inside causticizing.

It was then discovered that a caustic liquor could be obtained containing about 90% or more of the total soda in the form of caustic by utilizing diluted spent liquor containing caustic soda, sodium aluminate and sodium carbonate with a total soda concentration from about 100 to about 175 grams per liter (expressed as equivalent $Na_2CO_3$) by reacting the fresh soda ash and lime in the liquor at temperatures in excess of 220° F., that is, by a high temperature pressure digestion. This increase in caustic content to a caustic to total soda ratio of .900 or more by increase in reaction temperature is a result contrary to that which would be expected as evidenced by the literature. T. P. Hou in the text "Manufacture of Soda," page 287, in referring to the lime-soda ash causticizing reaction states: "It may not be out of place to point out here that the temperature does not influence the degree of conversion to any great extent. . . . In practice, so long as the temperature is high enough to bring about the reaction quickly and get rapid settling for the sludge, the temperature of causticization is rather immaterial."

As indicated above the total soda concentration for the causticizing process of the invention is preferably from about 100 to about 175 grams per liter. By "total soda" is meant the total concentration of $Na_2O$ present as carbonate (including fresh soda ash added), hydroxide and aluminate, expressed as equivalent $Na_2CO_3$. Concentrations in excess of about 175 grams per liter tend to reduce the efficiency of the causticization in terms of lime utilization and result in a caustic content having a value below that which is desired. Although concentrations much lower than 125 grams per liter produce excellent causticizing conversions, they are not recommended for the reason that excessive evaporation is necessary to obtain the desired caustic concentration for digestion, namely a concentration in excess of 150 grams per liter (expressed as causticized $Na_2CO_3$). However, a total soda concentration of about 100 grams per liter may be utilized with good results where evaporative capacity permits. The preferred total soda concentration is about 150 grams per liter. This gives an optimum caustic content to the causticized liquor relative to total soda, while at the same time requiring a minimum of evaporation.

This critical range of total soda concentration for the causticizing reaction is obtained by diluting a selected portion of the spent liquor to a value within this range and combining with the diluted spent liquor fresh soda ash solution made up to the same concentration. Of course, the diluting and make-up water for both the spent liquor and the fresh soda ash solution respectively, may be simultaneously supplied to a slurry of the soda ash in the spent liquor in the amount necessary to produce the selected concentration. The solution thus prepared is used as the medium for the causticizing reaction.

The portion of total soda provided by the spent liquor cut out from the main flow consists in part of sodium carbonate, for example, 20%. The amount of carbonate which builds up in the total plant liquor due to process carbonation and uncausticized soda ash over a given period is readily determined. The causticized liquor from the causticizing reaction consists of 90% caustic and only 10% carbonate, which indicates in the case of a 20% carbonate content in the total soda content of the spent liquor that one half or 50% of the spent liquor carbonate was causticized. Thus, the total amount of spent liquor which must be sent to the causticizing reaction to causticize all carbonate formed by process carbonation and to maintain a circulating carbonate content not exceeding 20% of the total soda is simply a volume of spent liquor having a total carbonate content equal to the amount of carbonate formed by process carbonation divided by the degree of conversion in the reaction. For example, when process carbonation forms nine tons of carbonate per day per unit and the spent liquor has a caustic to soda ratio of .800 or 20% carbonate liquor charged to the causticizing reaction must be a volume which contains at least 18 tons of carbonate per day in order that all carbonate due to process carbonation be eliminated. Thus, the total volume of spent liquor sent to outside causticizing will depend first on the amount of process carbonation, and on the caustic to soda ratio in the spent liquor, which in turn determines the actual degree of conversion during the causticizing reaction.

Of course, the dilute spent liquor always contains a higher soda concentration than that due to process carbonation, since there is also an amount present due to previous incomplete causticization. This amount remains as the 10% of total soda present as carbonate in the effluent liquor from the causticizing reaction, the balance of the total soda being caustic.

The balance of the carbonate in the total soda of 100–175 grams per liter in the solution to be causticized is, of course, the fresh soda ash added to the diluted spent liquor sent to causticization. This soda being causticized along with the spent liquor carbonate is 90% causticized. Thus, process carbonation is completely compensated and the maximum carbonate content of the plant liquor is 20% due to uncausticized new soda.

The circulating load of uncausticized soda in the total plant liquor is thus reduced within limits to a value well below that present when practicing inside causticizing. For example, the minimum circulating load of carbonate in inside causticizing is 30% of the total soda whereas by the present process a maximum of about 20% is maintained. This 20% may be further reduced by increasing the volume of spent liquor cut out from the total flow in the primary system and sent to causticization per cycle relative to that which is directly recycled to the digesters. A reduction in circulating load of carbonate from about 2500 to less than 1700 tons in a given plant unit over a fixed period of operation, has been accomplished by the invention. However, the volume of spent liquor diluted and sent to causticizing must always remain only a small fraction (below 10%) of the total volume of spent liquor discharged from hydrate precipitation per cycle. Otherwise, the caustic and alumina concentrations relative to total soda would be too high in the prepared diluted spent liquor and lime efficiency in the reaction would be greatly lowered. In addition excessive amounts of diluting water would be required and would necessitate excessive evaporation to remove it.

The highly caustic liquor from causticizing is mixed with the undiluted spent liquor and recycled to the bauxite digesters after removal of the diluting water. This water may be removed from the causticized liquor before combining with the undiluted liquor, or it may be removed from the combined liquors, or even from the undiluted spent liquor. The resulting digestion liquor has a caustic concentration well above 150 grams per liter and may be as high as 220.

The caustic concentration in the dilute spent liquor employed as the reaction medium for causticizing may vary within wide limits and is fixed by the total soda concentration and the amount of carbonate present. At all times after dilution and soda ash addition the caustic soda concentration, although substantial, is well below the minimum caustic concentration encountered with inside causticization and is not substantially in excess of about one-half of the total soda concentration, as more specifically shown in Table II below. In general, the value is below about 60 grams per liter, but may exceed this value when total soda is near the maximum of 175 grams per liter.

Lime is preferably introduced into the causticizing operation in an amount theoretically required to causticize all of the new soda ash, plus the carbonate in the dilute spent liquor, plus that in the pond water preferably used to dilute. Excess of lime such as 10 to 20% over the theoretical quantity may be used but does not affect the degree of conversion. It does, however, increase alumina losses and is not recommended.

The temperature range for the causticizing reaction extends from about 225° to about 325° F. for obtaining the high caustic to total soda ratios characteristic of the invention. Below about 225° F. the reaction rate is lowered and the degree of conversion is sharply reduced. Extended digestion time at such temperatures fails to increase the caustic concentration and is disadvantageous in that alumina losses due to formation of calcium aluminate are increased. On the other hand, temperatures above about 325° F. are not desirable due to the high steam pressure required in the digester and because they are accompanied by increase in alumina loss from the liquor as calcium aluminate. The preferred causticizing temperature is about 250° F., while a range of from about 240 to about 290° F. has produced optimum results in regard to both caustic content of the causticized liquor and maximum alumina recovery.

The causticizing reaction may be carried out in any suitable steam pressure apparatus, for example, an autoclave. Pressures of from about 2 to about 70 pounds per square inch gauge are utilized in order to maintain the reaction temperature at the desired value.

The reaction time does not materially effect the causticizing efficiencies in terms of lime utilization and degree of conversion of soda and, therefore is not critical. Reaction times of from less than twenty minutes to three hours or over have been employed to obtain causticized liquor of 90% caustic content or over in all cases. However, as stated above, long treatment times increase alumina loss, and, of course, the shortest possible time is the most desirable since it increases plant capacity per unit.

Theoretically the best alumina concentration is zero, but in utilizing dilute spent liquor a certain amount must be present. This concentration is fixed by the caustic concentration and this is dependent on the factors fixing the value of the latter, as outlined above. In general it is about .3 of the caustic concentration.

The invention is illustrated in greater detail below with reference to a typical plant operation described in conjunction with the drawing, representing a flow diagram of the outside causticizing feature of the invention together with the primary alumina recovery system.

A portion (3%) of the spent caustic aluminate liquor A from the alumina precipitators diluted with hydrate wash water was cut out from the total spent liquor B and was fed at a rate of about 85 gallons per minute of diluted solution to a mixer where it was further diluted with red mud pond water fed at about 115 gallons per minute. Soda ash was charged to the mixer at the rate of 110 pounds per minute and lime at the rate of 83 pounds per minute. The spent liquor before the second dilution contained 180 grams per liter total soda, of which, 140 was caustic soda (expressed as causticized $Na_2CO_3$). Thus the liquor had a caustic to total soda ratio of about .777. The difference or 40 grams per liter represented the carbonate content of the liquor. After the second dilution and with the stated rate of feed of new soda ash, the total soda concentration was 150 grams per liter, and caustic concentration was 66 grams equivalent $Na_2CO_3$ giving a caustic to total soda ratio of .440. The sodium carbonate concentration was 150-66 or 84 grams per liter.

The total slurry C, that is 200 gallons per minute, was charged to an autoclave maintained at 250° F. by introduction of saturated steam at 100 PSI gauge. The slurry was digested for about twenty minutes and then discharged as digester product D to classifying and thickening apparatus where the lime sludge E ($CaCO_3$) containing some calcium aluminate was settled and removed from the caustic liquor. The total soda and caustic concentrations in the clarified liquor F were 132 g./l. and 120 g./l., respectively, leaving 12 g./l. of carbonate. This represents a causticizing conversion about 85%.

The clarified caustic liquor F was discharged from the thickener as overflow at the rate of 185 gallons per minute and 115 gallons per minute of the original spent liquor B was added thereto. This spent liquor had a total soda concentration of 247 grams per liter of which 195 grams per liter was caustic soda (expressed as equivalent $Na_2CO_3$).

The total volume of caustic fortified liquor G, that is, 300 gallons per minute, was charged to a concentrating evaporator. This liquor contained 205 grams per liter total soda, and 164 grams per liter of caustic soda. The caustic liquor G was concentrated to an effluent H of 212 gallons per minute having a total soda concentration of 290 g./l. of which 232 g./l. was caustic soda.

This highly caustic liquor was then mixed with the 97% proportion of the original spent liquor B producing a caustic concentration of 200 grams per liter. This liquor I was then charged directly to the bauxite to form the bauxite slurry, and was also charged through heat exchangers to the bauxite digesters, where the bauxite was digested about 290° F. in the highly concentrated caustic liquor.

The balance of the operation, that is, the typical Bayer process was performed in the usual manner. The digested alumina enriched caustic slurry containing dissolved alumina was treated to remove the insoluble red mud, silica, etc., including the ordinary hot filtration step in the presence of calcium carbonate from the outside causticizing. The pregnant aluminate liquor was cooled and seeded and the aluminum trihydrate precipitated. A portion of the remaining caustic aluminate liquor was sent to outside causticizing and the cycle was repeated.

The data relative to the above-described run is presented in tabular form, the literal designations conforming to those used on the flow diagram:

*Table I*

| | Material | Flow Rates lbs./min. | Flow Rates G.P.M. | % Solids | Temp. °F. | Total Soda both equivalents=S | Caustic Soda $Na_2CO_3$ =C | Dissolved $Al_2O_3$=A | Ratio A/C | Ratio C/S | % Reaction |
|---|---|---|---|---|---|---|---|---|---|---|---|
| A | Dilute Liquor in | | 85 | 0 | 130 | 180 | 140 | 35 | .250 | .780 | |
| | Pond Water in | | 115 | 0 | 150 | 18 | 12 | 6 | .500 | .667 | |
| | Soda Ash | 110 | | 100 | | | | | | | |
| | Lime | 86.5 | | 100 | | | | | | | |
| C | Total Slurry to digester | | 200 | | 180 | 150 | 66 | 18 | .270 | .440 | |
| D | Digester Product | | 230 | 5 | 250 | 130 | 118 | 13 | .110 | .910 | 84 |
| E | Thickener Underflow | 100 | | 20 | | | | | | | |
| F | Thickener Overflow | | 185 | 0 | | 132 | 120 | 13.2 | .110 | .910 | |
| B | Spent Liquor Added | | 115 | 0 | | 247 | 195 | 60 | .305 | .790 | |
| G | Liquor to Evaporator | | 300 | 0 | 170 | 205 | 164 | 42 | .256 | .800 | |
| H | Evaporator Product | | 212 | 0 | | 290 | 232 | 60 | .258 | .800 | |
| I | Liquor to Bauxite Digesters | | 2,200 | | | 250 | 199 | | .300 | .795 | |
| J | Liquor in Digested Slurry | | | | | | | | .610 | .793 | |

The invention is further illustrated with reference to the following results of additional causticizing runs made at varying total soda concentrations, temperatures, and treatment times, which data, as in the case of the above example is not intended to constitute a limitation of the invention:

*Table II*

| | | REACTION | | | | | PRODUCT | | | |
|---|---|---|---|---|---|---|---|---|---|---|
| Run No. | CaO g./l. | Time Min. | Temp. °F. | Total Soda g./l.=S | Caustic Soda g./l.=C | C/S | C/S | Total Soda g./l.=S | Caustic Soda g./l.=C | Lime Efficiency % Reaction |
| 1 | 39.5 | 20 | 325 | 125 | 50.7 | .406 | .911 | 125 | 113.9 | 85 |
| 2 | 26.5 | 20 | 290 | 100 | 50.7 | .507 | .937 | 100 | 93.7 | 87 |
| 3 | 53.0 | 20 | 325 | 150 | 50.7 | .338 | .928 | 150 | 138.2 | 89 |
| 4 | 38.9 | 60 | 240 | 100 | 27.7 | .277 | .930 | 100 | 93.0 | 90.4 |
| 5 | 28.4 | 20 | 300 | 100 | 55.3 | .553 | .974 | 100 | 97.4 | 94.2 |
| 6 | 39.5 | 20 | 325 | 125 | 50.7 | .406 | .941 | 125 | 117.6 | 90 |
| 7 | 26.9 | 180 | 270 | 100 | 50.3 | .503 | .942 | 100 | 94.2 | 88.5 |

In all of the foregoing runs the reaction was at least 85% complete, while the average per cent reaction was 89.1%. In all cases the caustic to soda ratio in the causticized liquor was over .9. The results also indicate that extended treatment time does not have any material effect on the degree of conversion.

The calcium carbonate formed by inside causticizing is lost to further utilization because it is mixed with the red mud. However, the calcium carbonate or a portion thereof formed by the instant causticizing reaction may advantageously be employed in one or more ways. It may be calcined to lime, and thus furnish at least a part of the lime required for causticizing, or it may be sent to the primary system as lime sludge E (see Figure 1) and introduced between the digesters and red mud filters to aid in the settling and filtration of the same.

As a result of the invention, the alumina producing capacity per existing plant unit may be increased as much as 100 to 150 tons per day. This is accomplished merely by an increase in the bauxite digestion caustic soda concentrations of from 150 grams per liter (expressed as causticized $Na_2CO_3$) to from 170 to 180 grams per liter made possible by the improved causticizing process. Even higher equivalent caustic concentrations containing 200 grams per liter, as in the example, may be obtained. The increase in alumina producing capacity by use of a stronger solvent to digest more bauxite per unit volume of treatment space is mainly limited by the maximum caustic concentration that can be tolerated throughout the system. The most sensitive location is in the red mud filtration phase where the filter cloths are destroyed at a rate roughly proportional to caustic concentration. Concentrations up to about 180 grams per liter may be tolerated. For values in excess of 180 g./l. other satisfactory apparatus for clarification or filtration may be employed, for example, sand filters.

This increase of at least 100 tons per day in alumina production per unit results in a corresponding decrease in the per ton cost of the purified alumina.

A further advantage of the process may be mentioned. There is an unavoidable loss of total soda in the practice of the Bayer process. Part of this loss represents mechanical liquor losses from the system. The sodium carbonate portion of this loss is reduced by about one third, since the circulating load of carbonate in the plant liquor is at least one third less than in the practice of inside causticization.

What I claim is:

1. In a process for the extraction of alumina from aluminous ores in which the ore is pressure digested in a caustic aluminate liquor to convert the alumina of the ore into alkali aluminate, the red mud insolubles are separated from the pregnant aluminate liquor, alumina hydrate is recovered from the liquor by autoprecipitation upon cooling and seeding, and the spent liquor is recycled to the ore digestion phase, the improvement which comprises preparing a sodium carbonate solution in diluted spent caustic aluminate liquor having a substantial caustic soda concentration to obtain a total soda concentration of from about 125 to about 175 grams per liter, said caustic soda concentration being not substantially in excess of about one-half of the total soda concentration, reacting lime with the sodium carbonate in the prepared solution by pressure digesting at temperatures of from about 240 to about 300° F. whereby the effluent liquor contains at least 90% of the total soda in the form of caustic, concentrating the resulting caustic liquor and mixing with the undiluted spent liquor thereby providing a caustic aluminate liquor having a caustic soda concentration in excess of 150 grams per liter for recycling to the ore digestion phase.

2. A process according to claim 1 in which the total volume of spent liquor diluted and utilized as the medium for the causticizing reaction over a given period has carbonate content at least equal to that formed in the total plant liquor due to process carbonation of caustic soda during a like period whereby the circulating load of carbonate in the plant liquor in substantially reduced.

3. A process according to claim 1 in which at least a portion of the calcium carbonate formed by the lime soda causticization in the diluted spent liquor is introduced into the digested ore slurry in the primary alumina recovery system to aid in the separation of the red mud insolubles from the pregnant aluminate liquor.

4. A process according to claim 1 in which the total soda concentration of the diluted spent liquor containing the added sodium carbonate is about 150 grams per liter and the reaction temperature for the lime-sodium carbonate reaction is about 250° F.

5. A process according to claim 1 in which the causticized spent liquor after concentrating and mixing with the original spent liquor has a caustic soda concentration of at least about 170 grams per liter.

6. A method of causticizing sodium carbonate with lime to form caustic soda for the extraction of alumina from aluminous ores by the wet caustic aluminate method which comprises diluting a portion of the spent caustic aluminate liquor remaining after alumina precipitation to a total soda concentration of from about 100 to about 175 grams per liter while simultaneously dissolving sodium carbonate in additional water added to the diluted spent liquor to obtain a solution having a total soda concentration of from about 100 to about 175 grams per liter, reacting lime with the sodium carbonate in the prepared solution by pressure digesting at a temperature of from about 225 to about 325° F. whereby the effluent liquor contains at least 90% of the total soda in the form of caustic, mixing the resulting caustic liquor with undiluted spent liquor, and removing the diluting and added water thereby forming a caustic aluminate liquor having a caustic soda concentration in excess of 150 grams per liter.

7. A process according to claim 6 in which the total volume of spent liquor diluted and utilized as the medium for the causticizing reaction over a given period of time has carbonate content at least equal to that formed in the total plant liquor due to process carbonation of caustic soda during a like period whereby the circulating load of carbonate in the plant liquor is substantially reduced.

8. A process according to claim 6 in which the portion of spent liquor diluted is about 3% of the total.

9. A process according to claim 6 in which the sodium carbonate solution and the diluted spent liquor as combined have a total soda concentration of about 150 grams per liter.

10. In a process for the production of alumina from aluminous ores by the wet caustic aluminate method, the steps comprising diluting a portion of the spent caustic aluminate liquor to a total soda concentration of from about 100 to about 175 grams per liter, said portion of spent liquor which is diluted having a total soda content essentially comprising in part a sodium carbonate content at least equal to that formed by process carbonation and uncausticized fresh soda per cycle divided by the degree of conversion in causticizing, said diluted portion of the spent liquor also having a substantial caustic soda concentration but not substantially exceeding about one-half of the total soda concentration adding sodium carbonate solution with a total soda concentration of from about 100 to about 175 grams per liter to the diluted spent liquor, causticizing the resulting solution by reacting the sodium carbonate with lime at temperatures of from about 240 to about 300° F. whereby the carbonate in the plant liquor due to process carbonation is eliminated, and the causticized solution contains a caustic content of at least 90%.

11. A process according to claim 10 in which the spent liquor diluted for use as the causticizing medium has a sodium carbonate content of about 20% and about one-half of such carbonate in causticized by lime.

WINSTON H. CUNDIFF.

No references cited.